(No Model.)  L. K. JOHNSON & A. A. LOW.  7 Sheets—Sheet 1.
COMPOSITOR'S TYPE AND SPACE HOLDER.

No. 336,719.  Patented Feb. 23, 1886.

(No Model.)
7 Sheets—Sheet 2.

L. K. JOHNSON & A. A. LOW.
COMPOSITOR'S TYPE AND SPACE HOLDER.

No. 336,719.  Patented Feb. 23, 1886.

(No Model.)   L. K. JOHNSON & A. A. LOW.   7 Sheets—Sheet 4.
COMPOSITOR'S TYPE AND SPACE HOLDER.
No. 336,719.   Patented Feb. 23, 1886.
*Figure 4.*
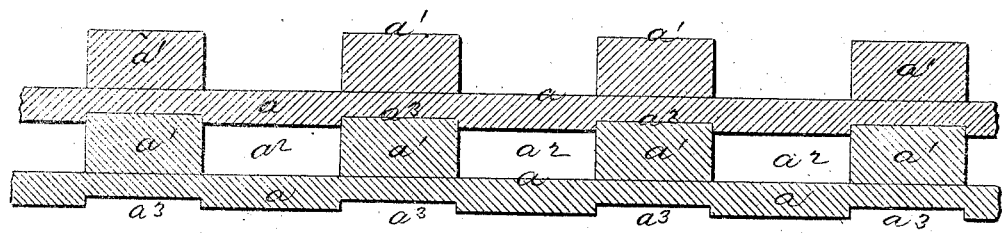
*Figure 5.*
*Figure 7. Figure 6.*   *Figure 8.*   *Figure 9.*
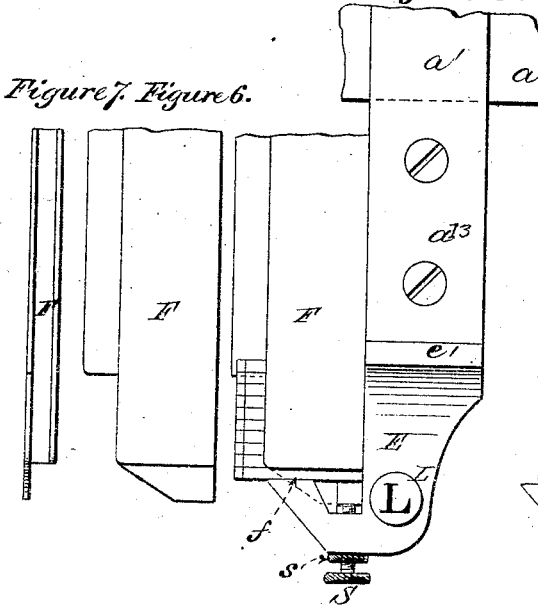
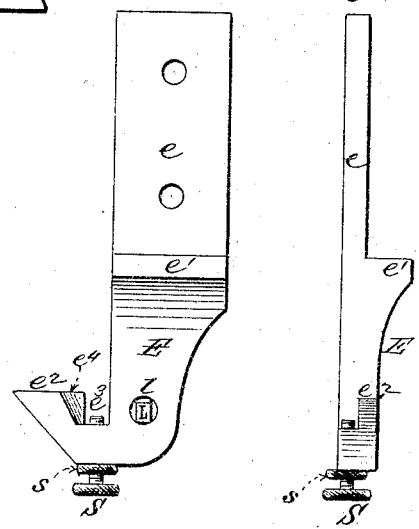
*Figure 11. Figure 12.*   *Figure 10.*
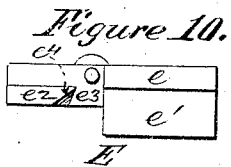

(No Model.) 7 Sheets—Sheet 5.
L. K. JOHNSON & A. A. LOW.
COMPOSITOR'S TYPE AND SPACE HOLDER.

No. 336,719. Patented Feb. 23, 1886.

(No Model.) 7 Sheets—Sheet 7.
L. K. JOHNSON & A. A. LOW.
COMPOSITOR'S TYPE AND SPACE HOLDER.
No. 336,719. Patented Feb. 23, 1886.
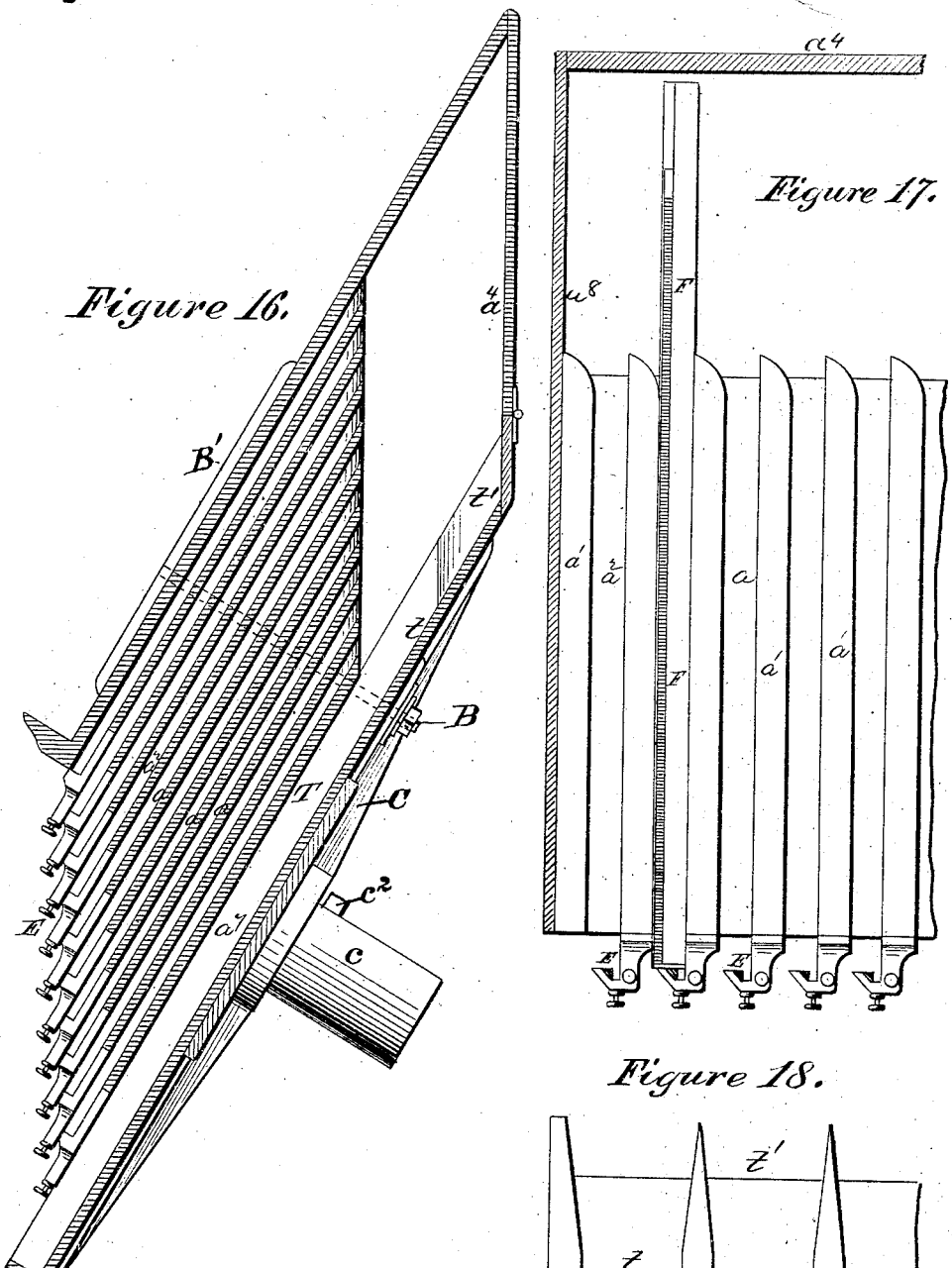

UNITED STATES PATENT OFFICE.

LOUIS K. JOHNSON AND A. AUGUSTUS LOW, OF BROOKLYN, ASSIGNORS TO THE ALDEN TYPE MACHINE COMPANY, OF NEW YORK, N. Y.

COMPOSITOR'S TYPE AND SPACE HOLDER.

SPECIFICATION forming part of Letters Patent No. 336,719, dated February 23, 1886.

Application filed April 9, 1883. Serial No. 91,047. (No model.)

*To all whom it may concern:*

Be it known that we, LOUIS K. JOHNSON and A. AUGUSTUS LOW, citizens of the United States, residing in the city of Brooklyn, in the county of Kings and State of New York, have invented certain new and useful Improvements in Compositors' Type and Space Holders, of which the following is a specification.

Our invention relates to the class of compositors' type-cases in which the types are arranged in prescribed positions in containing-channels, from the lower ends of which they may be removed by hand, as set forth in Letters Patent Nos. 230,784, August 3, 1880; 254,019, February 21, 1882; 263,707, September 12, 1882; 268,409, December 5, 1882, and 271,711, February 6, 1883.

The object of our present invention is to more completely adapt type-cases of this class to the wants and convenience of a compositor, and at the same time simplify and cheapen the construction of the case as a whole; and the invention consists, generally, in the special construction, arrangement, and combination of parts hereinafter described.

Figure 1:
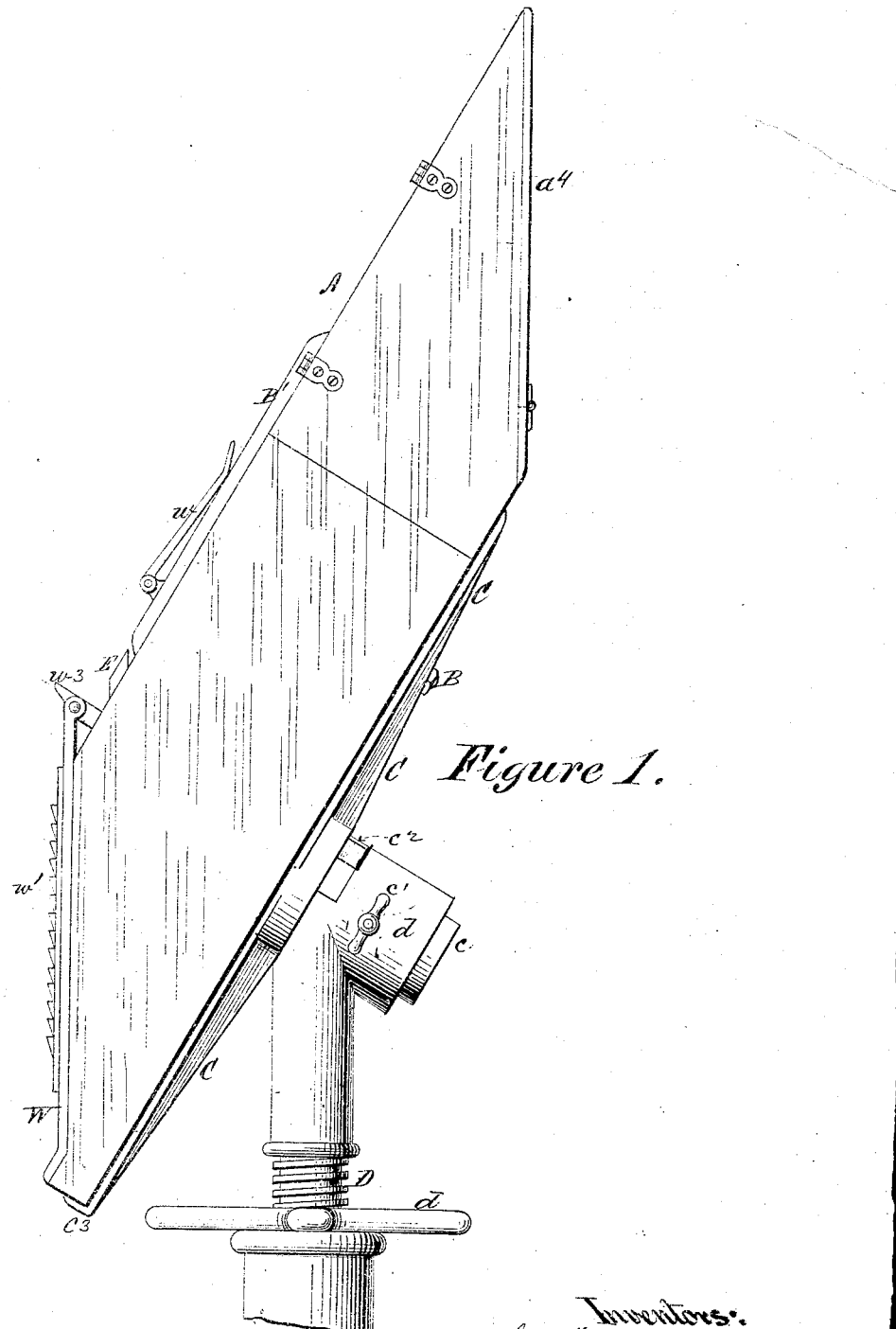
Figure 2:
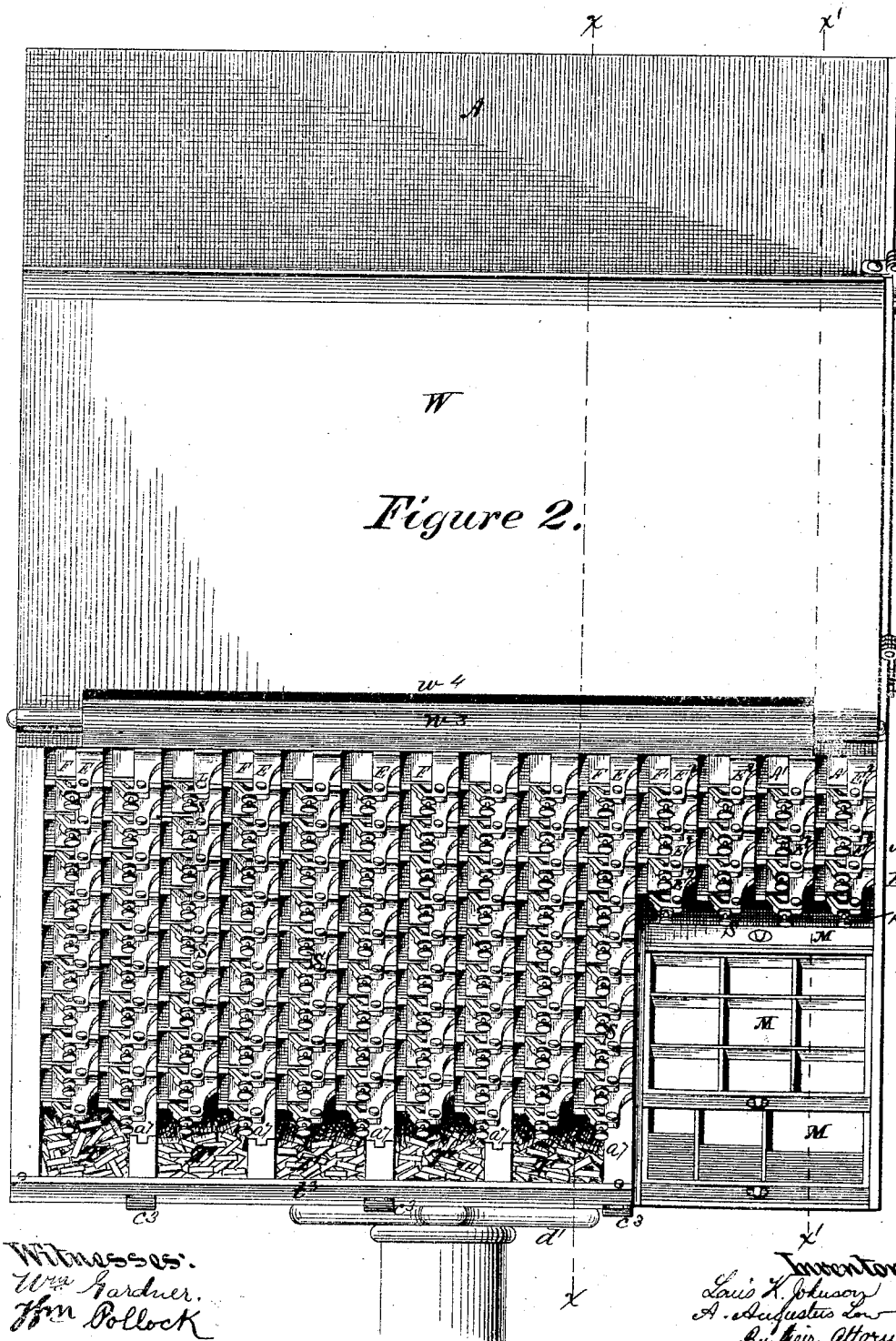
Figure 3:
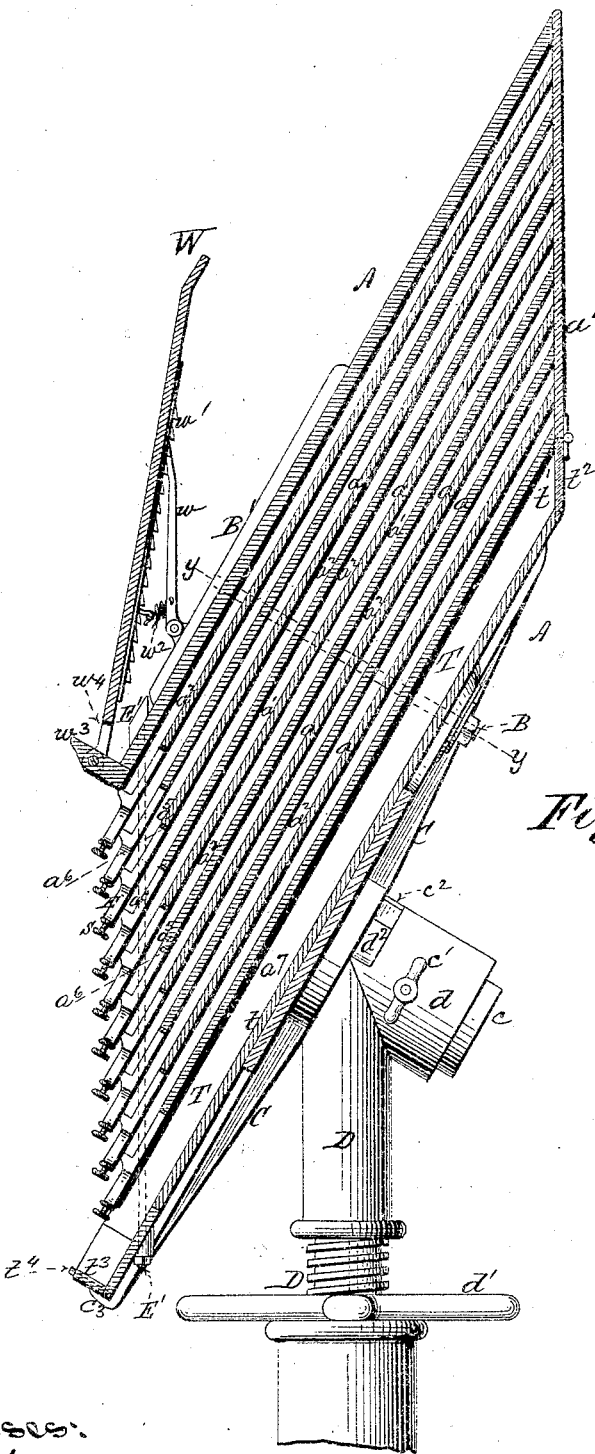
Figure 13:
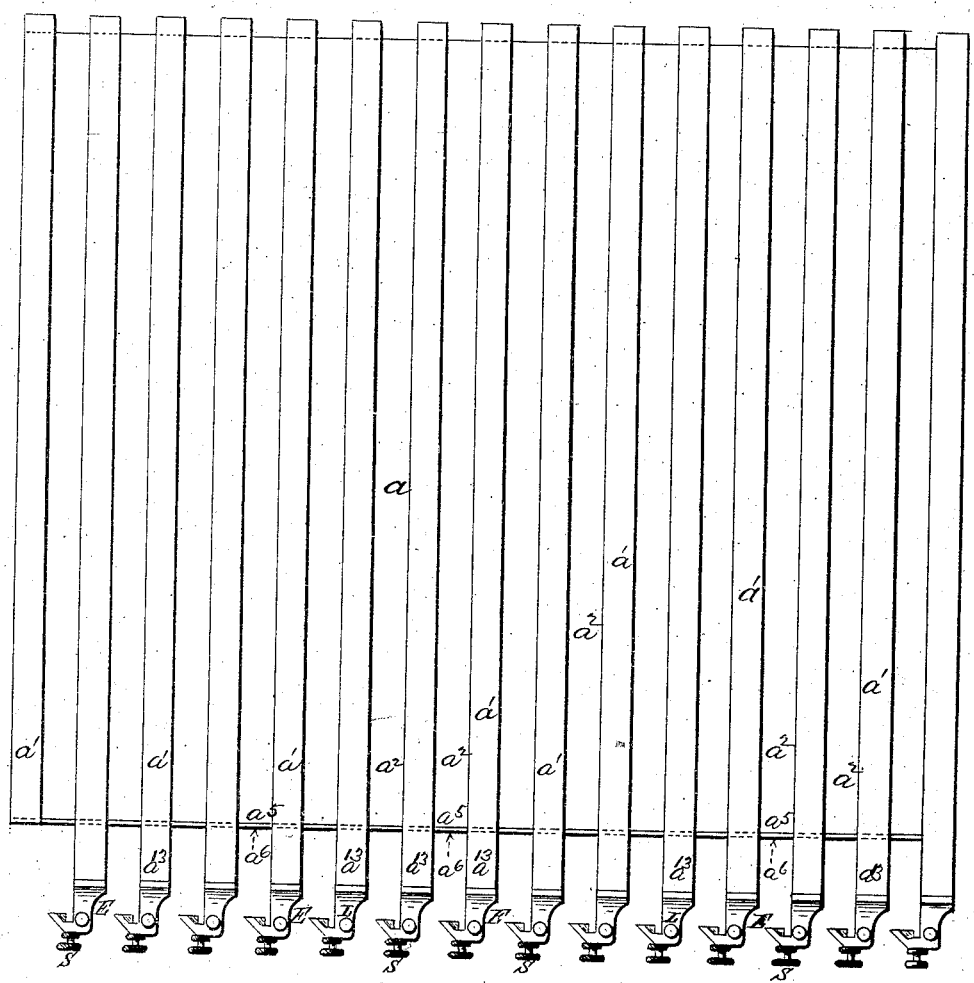
Figure 14:
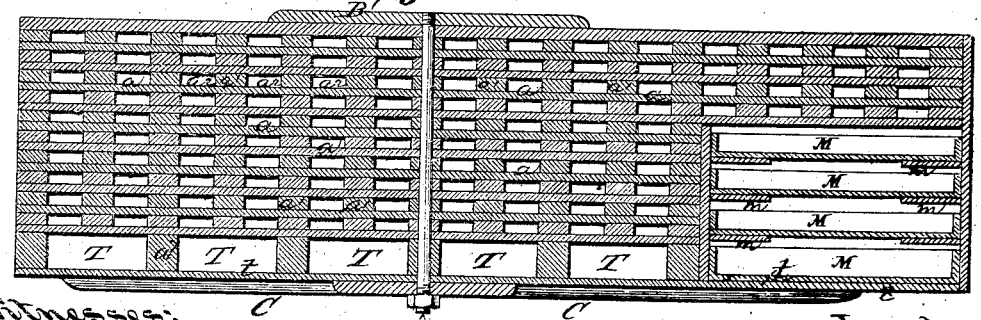
Figure 15:
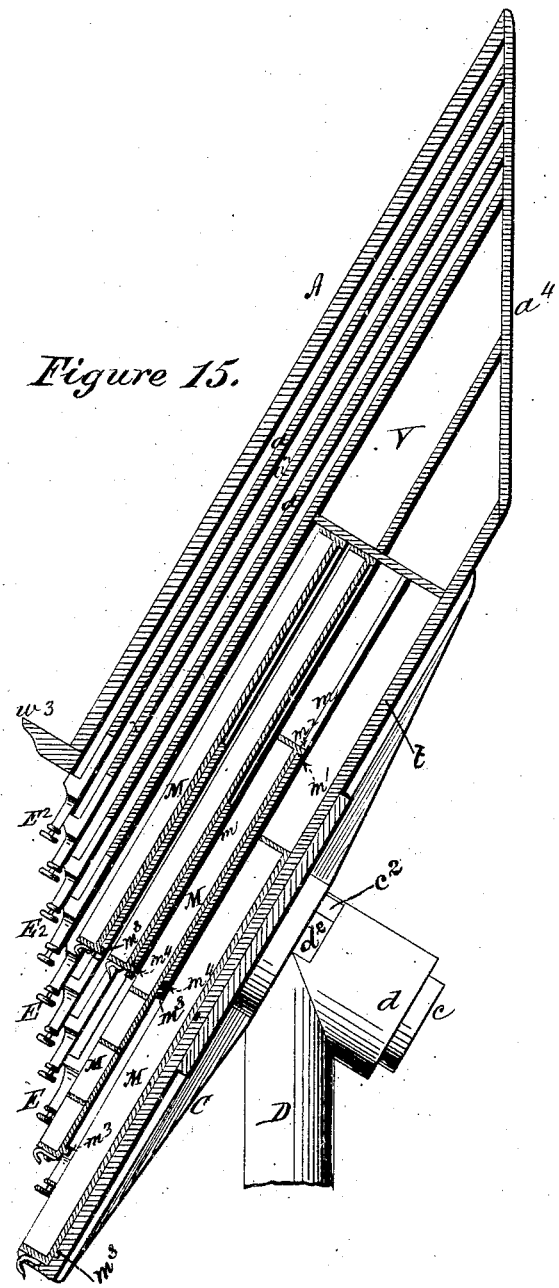

In the accompanying drawings, Figure 1 is an elevation of the right-hand side of our improved compositor's case closed. Fig. 2 is a front elevation of the same when open and ready for use. Fig. 3 is a vertical section on plane of line $x\,x$, Fig. 2. Fig. 4 is a transverse sectional view of adjoining portions of the superimposed bed-plates and their division-pieces, full size, showing the method of interlocking the parts. Fig. 5 is a front elevation, full size, of the projecting end of one of the division-pieces with a metallic "finger-piece" or seat secured thereto, the latter being represented as supporting the lower portion of a containing-channel and the types therein. Fig. 6 is a front elevation of the lower portion of one of the sheet-metal type-containing channels, and Fig. 7 an edge view of the same taken from the left-hand side. Fig. 8 is a front elevation of one of the metallic finger-pieces or channel and type seats; Fig. 9, a side elevation taken from the left-hand side of the same, and Fig. 10 a plan of the same. Figs. 11 and 12 are respectively rear and side elevations of one of the interchangeable denomination-marks. Fig. 13 is an elevation of the front side of one of the first upper four bed-plates with division-pieces and type and channel seats. Fig. 14 is a transverse section of the body of the case upon plane of line $y\,y$, Fig. 3. Fig. 15 is a vertical section of the right-hand side of the case taken upon plane of line $x'\,x'$, Fig. 2. Fig. 16 is a vertical section of the body of the case on plane of line $x\,x$, Fig. 2, showing the inclosed space for the projection of the containing-channels beyond the channel-compartments when the latter are made shorter than the containing-channel. Fig. 17 is a detail view of the construction shown in Fig. 16, being a plan of the left-hand portion of one of the bed-plates, &c., and showing the inclosing-shell in section. Fig. 18 is a plan of a portion of the bed-plate and upper extremities of the space-compartments, showing the flaring mouth or entrances to the latter.

Heretofore we have constructed the bodies of our type-cases of a series of superimposed interlocking metallic plates; but such construction, though durable and effective, is expensive, and renders the case objectionably heavy, while the metallic surfaces are liable to injure the faces of the type should the latter accidentally be brought in contact therewith.

In the accompanying drawings, the body of the case A is composed or built up of a series of superimposed plates, $a$, formed of wood or other similar material, which affords a comparatively high degree of lightness and elasticity of surface combined with the requisite degree of strength. These plates are provided with division pieces or ribs $a'\,a'$ of the same or a similar material, which answer the double purpose of separating the bed-plates $a\,a$ to the required distance, thereby creating longitudinal grooves or recesses $a^2\,a^2$ for the reception of the bodies of the type-containing channels, and of furnishing means at their lower extremities for the attachment and support of the combined type and channel seats, which it is desirable to form of metal.

For the purpose of rendering the case when secured together strong and rigid and preventing the warping of the material, we prefer to form longitudinal grooves $a^3\,a^3$ upon the under sides of the bed-plates $a$, corresponding to and receiving the upper sides of the divison-pieces $a'$ $a'$, which latter, of wood or other similar material, are made of strips in which the grain or fiber extends longitudinally and substantially at right angles to that of the bed-pieces. By this means, when the series of plates $a$ $a$ are clamped together by means of bolts B, passing through the superimposed bed-plates and coinciding division-pieces, as shown in Fig. 14, a perfectly-rigid nest or frame-work for the reception of the type-containing channels is created, which is comparatively light and inexpensive, while affording all the advantages of the former metallic case, since by using a suitable number of the clamping devices B the construction will be for all practicable purposes sufficiently strong and permanent in form, while the comparative softness and elasticity of the material used greatly diminishes the danger of injury and excessive wear to both type and channels, which was liable to occur in the metallic case by reason of contact with the hard unyielding surfaces of the latter.

It will be observed that, owing to the form of the containing-channels, which are preferably, if not necessarily, made open upon one side, (the left,) so as to expose the face ends of the types, said type faces are liable to be brought into contact with the opposed right-hand sides of the division-pieces, owing to carelessness in inserting the containing-channels into their places in the body of the case, or by reason of jar, or from other accidental cause. In fact, the said right-hand side of each division-piece $a'$ performs the office to a greater or less extent of a guiding and retaining surface to the column of type in the opposed containing-channel. It is therefore obvious that, owing to the softness of the type-metal, the division-pieces $a'$ $a'$, formed of wood or other similar semi-elastic substance, are a decided and important improvement upon the old form of metallic division-pieces, since they furnish a guiding and retaining surface to the column of type which will do the least possible damage to the faces of the types when the latter suffer contact therewith.

The bolts B are preferably connected at the top with broad bearing-plates B', into which the ends of the bolts are countersunk or tapped, as shown in Fig. 14, for the purpose of distributing and equalizing the clamping or binding action of the bolts, and they secure the superimposed bed-plates as a unit to a metallic frame or spider, C, formed with a bearing or axis, $c$, which projects at right angles to the planes of the bed-plates $a$. This axis $c$ is supported in a suitable socket, $d$, formed upon the upper end of the vertical screw D, by means of which the case may be raised or lowered bodily through the medium of the hand-nut $d'$. The socket $d$ is provided with a set-screw, $c'$, for binding against the axis $c$. The elevation and inclination of the case is thus provided for, as described in our Patent No. 271,711, February 6, 1883, except that no provision is made for varying its vertical inclination, the most appropriate angle, when considered with relation to the descent and withdrawal of the types, being ascertained and made permanent, while any variation in the weight or size of the different fonts of types to be used may be compensated for by the lateral adjustment of the body of the case upon its axis, so as to cause the types to rest more or less upon their lower ends or feet. By this arrangement we are enabled to insure the presentation of all the types to the compositor in the same vertical plane under all circumstances. An additional feature in this connection, not heretofore used, is the means for limiting the lateral movement of the case upon its axis, consisting of a shoulder or projection, $c^2$, upon the axis $c$, which travels in a slot or recess, $d^2$, formed in the socket-piece $d$, and by its contact with one or the other of the shoulders forming the extremities of the said slot preventing the further revolution of the case upon the axis $c$. The lower extremities of the division-pieces $a'$ project beyond the lower edges of the bed-pieces $a$ a sufficient distance to permit of the attachment of the finger-pieces or combined type and channel seats E, which are preferably formed of metal. These seats E are formed with a shank, $e$, which is equal to or less than the thickness of the bed-plates $a$, so that when they are secured to the under sides of the projecting portions $a^{13}$ of the division-pieces $a'$ and the bed-plates $a$ are secured together, as hereinbefore stated, the said shanks $e$ will occupy the spaces between the adjoining and vertically-coinciding ends of the division-pieces $a'$, said spaces being equal vertically to the thickness of the portions of the bed-plates between the superimposed division-pieces. These combined type-column seats and channel-supports E are also preferably formed with shoulders or abutments $e'$, which rest against and protect the lower extremities of the division-pieces $a'$, and practically render the finger-pieces or seats E extensions of the division-pieces $a'$. These metallic seats or finger-pieces E are secured to the lower projecting ends, $a^{13}$, of the division-pieces $a'$ independently by means of screws or similar fastenings, as shown in Fig. 5, or a series of them, consisting of those coinciding in position vertically, may be simultaneously secured and held in position upon the ends $a^{13}$ of the division pieces by means of a single bolt, E', passing alternately through the division-pieces $a^{13}$ and shanks $e$, as shown by dotted lines in Fig. 3. The finger-pieces proper, or type and channel supporting portions of the pieces E, project laterally from the bodies of the said pieces E toward the left, so as to extend underneath and opposite to the lower extremities of the longitudinal cells or recesses $a^2$ for the reception of the type-containing channels F. This part of the device is substantially the same in construction and operation as that shown and described in the patent to L. K. Johnson, No. 279,168, of June 12, 1883, in which the type-supporting shoulder $e^3$ is so formed that, after the lowest type has been only partially withdrawn and while its rear portion is still within the containing-channel, it will clear the type-supporting shoulder $e^2$, thereby expediting and rendering easier the removal of the type. This is effected, mainly, by forming the type-supporting shoulder with a depression or recess, $e^3$, immediately under the position of the foot or rear end of the lowest type in the column, so that when the face or head portion of the said lowest type is turned laterally during the action of cutting it off or removing it from its column its foot or rear end will be free and unrestrained before it is entirely withdrawn from the containing-channel F. In the application above referred to this action was still further contributed to by making the type-supporting shoulder of less width than that of the body of the type, so that the latter would have the least possible distance to travel laterally before clearing or being cut off from the said support; but there are objections to this construction, owing to variations in the widths of types of the different fonts that it may be required to use in the case, and we therefore accomplish the same result by, and the only novel feature of our construction in this connection consists in, making the type-supporting shoulder $e^2$ of a width equal to the greatest width of any of the different styles of types for which the particular case is adapted and designed, so as to support all types alike uniformly and evenly, and in forming its rear end or portion adjoining the depression or recess $e^3$ so that it ends in an oblique angle, $e^4$, with relation to the position of the body of the lowest type, the front edge of the type-supporting shoulder being considerably shorter than its rear edge, as shown in Fig. 10, so that when the body of the lowest type, which is grasped by its upper or face end, and which is therefore naturally turned more or less laterally during the act of withdrawing it, has assumed an angle corresponding to that of the rear edge or junction, $e^4$, between the shoulder $e^2$ and the slot $e^3$, it will be quickly released from the weight of the column of type above.

The type-containing channels F, which are supported upon the finger-piece by an adjusting-screw, S, substantially in the same manner shown and set forth in the Patent to L. K. Johnson, No. 254,019, February 21, 1882, are made of sheet metal "struck up" into the desired form. The adjustment of the width of the transverse slot or type-opening $f$ is effected by means of this screw S, which is in the present case provided with a set-nut, $s$, for rendering the adjustment more permanent when effected.

For the purpose of enabling the compositor to readily change the relative arrangement of the different characters in his case to suit his fancy or convenience, or to adapt it more fully to the requirements of a particular class of work, we provide interchangeable denomination-marks L.

We are aware that in the Patent to L. K. Johnson No. 263,707, September 12, 1882, an interchangeable denomination-mark is shown; but in that case the device performs the more important function of an adjustable channel-support, and can be removed or replaced only by loosening or tightening a set-screw. Besides, owing to the correspondence in thickness of a large number of the types in every font, it may be frequently desirable to change the denomination-mark without the necessity existing of altering the width of the "transverse slot" or type-opening $f$. For these reasons we provide an independent interchangeable "denomination-mark," L, which consists of a plug or button, upon which the required character is marked in any desirable manner, which fits into any one of the holes $l$, with which the metallic finger-piece E is provided for this purpose.

Although there are a variety of forms in which this interchangeable plug L may be made, we prefer to make it as shown in the accompanying drawings, consisting of a head or disk the face of which bears the denomination-mark, and from which a split stem, $l'$, projects, the elasticity of the two parts of the stem assisting in retaining the mark in its proper position when inserted in one of the holes $l$.

In cases where economy is desirable, or where the compositors prefer such means, the ordinary types in use in the case may be substituted for the plugs L by inserting the appropriate types in the holes $l$, in such manner that their faces project outward, as shown in Fig. 8. The containing-channels F are passed into their positions in their compartments $a^2$ in the body of the case from its lower front end over the seats or finger-pieces E, as in the Patent to L. K. Johnson, No. 254,019, February 21, 1882, and in his subsequent applications. In our present improved case we inclose the upper rear ends of the channel-compartments $a^2$, as shown at $a^4$ in Figs. 3 and 16, so as to exclude all dust and foreign substances therefrom, thereby protecting the columns of type and insuring their uniform and uninterrupted descent, and obviating the necessity of cleaning or "blowing out" the compartments from time to time, as has heretofore been necessary. The channel-compartments $a^2$ and bed-pieces $a$ may extend upward a distance equal to the full length of the containing-channels E, as shown in Figs. 3 and 13. The upper extremity of each channel-compartment $a^2$ will be sealed by the back plate, $a^4$; but, in order to cheapen and lighten the construction as much as possible, we prefer to construct the bed-plates $a$ and division-pieces $a'$ as small as practicable consistent with the proper support of containing-channels—that is, so that the channel-receptacles support the containing-channels for the greater portion of their lengths, but allow their upper ends to project beyond the upper extremities of the bed-plates $a$, as shown in Fig. 17; and the space essential for this projection of the upper extremities of the containing-channels F is inclosed and sealed by the surrounding portions of the rear and side walls, $a^4$ $a^3$, as indicated in Figs. 16 and 17. The upper extremities of both the type-containing channels F and their compartments $a^2$ will thus be effectually protected from dust or contact with foreign substances, while the weight of the body of the case is reduced. When thus constructed of less length than that of the containing-channels F, the upper extremities of the division-pieces $a'$ are beveled or rounded off, as shown in Fig. 17, upon the sides opposed to the faces of the types in the containing-channels, so that they will gradually return the types in the upper part of a column into proper alignment as the column descends, in case any of the types should from any cause project too far from the edge of the containing-channel. The front edges, $a^5$, of the lower ends of the bed-pieces $a$ being exposed more or less to accidental contact with the ends of the type-containing channels during the operation of inserting the latter into their respective compartments, and being in the present case of wood or other similar substance, are protected by strips of metal or guards $a^6$, (shown in Figs. 3 and 13,) secured to them in any suitable manner.

As a result of investigation and experiment entered into for the purpose of effecting the most complete, compact, and convenient arrangement of all the parts of a case constructed upon the principle involved in the patent to Louis K. Johnson, No. 230,784, August 3, 1880, and in his subsequent patents and applications therefor, we have discovered and devised the relative arrangement of type-channels, space-holders, &c., hereinafter described, as being specially advantageous when considered with relation to the various requirements of the different kinds of work ordinarily required of a compositor.

One feature to be noticed in connection with almost all branches of composition is the comparatively large quantity of "spaces" that are used in connection with a given quantity of the character-types. These spaces are not only inserted between each word, but frequently between the individual letters composing the words, and in "justifying" or completing each line in the stick some of these spaces are almost invariably discarded and other spaces of greater or less thickness substituted, in order to perfect the line. The consequence is that in a case constructed upon this principle—i. e., in which the types are arranged in prescribed positions in columns in containing-channels—an unusual and inconveniently large number of containing-channels have to be devoted to the holding of the necessary spaces, in order to approximate the proper proportion with relation to the number of character-types in the case, while the spaces discarded during composition, as above mentioned, have to be provided for by the use of separate receptacles, from which they have to be removed and redistributed into the containing-channels.

For the purpose of obviating these difficulties and economizing both space and labor, we combine and arrange with our channel-case, in which the types are arranged in prescribed positions in columns, as before mentioned, a series of space-holding compartments, T T, constructed substantially upon the plan set forth in the application of Louis K. Johnson for patent, filed September 18, 1882, in which the types are deposited loosely and without regard to relative position in elongated inclined boxes or compartments, from the lower ends of which they may be removed by hand at any angle or inclination—that is to say, we incorporate with the superimposed bed-plates $a$ and division-pieces $a'$, forming the channel-compartments $a^2$, and preferably underneath the latter, a suitable number of elongated box-compartments, T, for the reception and presentation of the necessary proportion of spaces of all kinds. These space-compartments T T extend backward and upward from the lower front end of the case, and are the same length as and are parallel to the channel-compartments $a^2$ $a^2$ above; and they may be constructed, as shown in the drawings, by a series of division-pieces, $a^7$ $a^7$, their bottoms or floors being formed by the final bed piece or plate, $t$. The spaces are fed into these compartments T through the upper rear openings or tops, $t'$, which are closed by suitable doors or covers, $t^2$, from which they descend by gravity to the lower front ends of the compartments, where they are supported by the front walls or type-shoulders $t^3$. The openings or tops $t'$ of space-compartments T are enlarged by beveling the upper extremities of the division-pieces $a^7$ $a^7$, as shown in Fig. 18, for the purpose of facilitating the introduction of the spaces. The lower front ends of the space-compartments T extend outward in front of and beyond the channel-seats E above, a sufficient distance to afford ample space for the access of the fingers of the compositor, for the purpose of picking up and withdrawing the spaces as required.

For the purpose of allowing the greatest possible capacity in these "space-holding" compartments, the space inclosed by the base-plate $t$ is divided into a number of compartments equal to the different sizes of spaces only, and their depth may be made, say, about equal to the depths of two of the channel-spaces, as indicated in the drawings, so that each space-compartment T will present in cross-sections an area and capacity much greater than the combined area and capacity of any four of the channel-compartments $a^2$ above, while monopolizing only a like space in the body of the case, as will be seen by reference to Fig. 14.

The space-holding compartments T T, constructed and arranged substantially as described, are adapted to perform a double function. They afford a storage capacity for large quantities of spaces, which may thus be included in a case in proper proportion to the quantity of character-types without duplication of compartments for a given denomination of space, the spaces being fed down automatically to the lower front ends of the compartments as fast as those in advance are removed, as described in the application for patent of Louis K. Johnson, last referred to, and their open lower ends also afford ever-ready and convenient receptacles for the spaces discarded by the compositor during the formation of the lines in the "stick," as hereinbefore described. This combination of functions is of great importance in practice, since it is to be remembered that spaces may be used indiscriminately in composition, as far as regards position, either end being placed uppermost, according to convenience, so that the spaces thus discarded and dropped into the open ends of the compartments T will always be available for reuse, thus avoiding the necessity of redistributing or rehandling them in any means whatsoever. The capacity of the case as far as spaces are concerned is thus increased in a double sense, the compartments themselves being virtually reservoirs that hold comparatively large quantities of spaces and feed them to the compositor as required, while their lower open ends, by receiving the discarded spaces and re-presenting them for immediate use, thus obviating all waste or "pi," practically augment the working capacity of the case in a still larger degree. It is to be observed in this connection that in practice the number of types so discarded and returned to the compartments during the operation of composition will always be comparatively few with relation to those permanently removed, so that there will never be any danger of an accumulation sufficient in number to exceed the capacity of the ends of the compartments.

For the purpose of enabling us to temporarily increase the quantity of spaces of a given denomination to be stored and presented by the case, as would be found advantageous in connection with certain peculiar classes of composition, we make the lower portions, $t^3$, of the division-pieces $a^1$ removable, so that the adjoining compartments may be united at the lower front end when filled with spaces of the same denomination. This may be done by mortise-and-tenon joints, as shown in Fig. 2, or by any other suitable means.

To provide for the convenient emptying or discharging of the space-compartments T when desired for any cause, we make the front wall or type-supporting shoulder $t^3$ removable. This is preferably accomplished by making the said supporting-shoulder adjustable laterally with relation to the case, so that one or more of the compartments may be emptied without distributing or endangering the others.

As shown in Figs. 2 and 3, the supporting-shoulder $t^3$ rests between the lower extremities of the division-pieces $a^1$ and the stationary lugs or shoulders $c^*$ of the spider or frame C, and is held in position by suitable pins, $t^4$, or other similar devices, by which it engages with the bed-plate $t$.

During the composition or "setting up" of tabular matter—such as market-quotations, price-lists, &c.—large numbers of numerals and "quads" are frequently required to be used in connection with comparatively few letters, and in this class of work it is also frequently necessary to use "leads" between the lines to a greater or less extent. For these reasons we have arranged the respective compartments in our case in the following manner, as will be more fully understood by reference to Fig. 2: In the central and left-hand portion of the case are arranged the one hundred (more or less) denominations of character-types, &c., constituting the bulk of the so-called "upper" and "lower" cases with our enlarged space-compartments underneath. On the right-hand side we arrange a series of type-containing channel-compartments, A', and seats $E^2$ in the upper part of the case for the accommodation and presentation of the numerals, $ marks, &c., and underneath these we construct one or more drawers or sliding compartments, M, for the reception and presentation of quads, leads, &c., arranged to present these essentials within convenient reach of the compositor, especially when he is engaged in the use of the numerals, &c., above. This construction is effected, preferably, by extending the first four or more upper bed-plates, $a$ $a$, over the space to be occupied by the drawers M and the "locker" V or receptacle, hereinafter to be described, and by extending the base-plate $t$ in a corresponding manner, as will be clearly seen by reference to Fig. 14, or in any other convenient manner, the design being simply to incorporate the said quad and lead holding drawers in the case in the most appropriate and convenient position to the other compartments when considered with relation to the class of work in which quads and leads are most frequently required. We prefer to arrange a series of three or four of these drawers M, one above the other, as shown in Figs. 2 and 15, so as to accommodate and store within convenient reach extra quads, leads, spaces, brackets, &c., and the "accented" and other character-types seldom used in composition. These drawers rest upon ways or supports $m$ $m$, which are parallel to the bed-plates $a$, and when closed or shoved back to their fullest extent these fronts occupy in common a plane which is at right angles to the longitudinal extension of the channel-compartments, thus leaving a portion of the bed-plate $t$ in front of them unoccupied sufficient in area to afford a convenient temporary resting-place for the compositor's stick. Suitable stops are arranged upon the drawers and supports to regulate their extent of movement in either direction, and their extent of forward projection with relation to each other is preferably regulated, so that the lowest will project a sufficient distance in advance of the next above, to allow access to both, as shown in Figs. 2 and 15. This is accomplished in the device represented in the drawings by the relative positions of the rear ends, $m'$, of the supports $m\ m$, which act as stops to the projections or lugs $m^1\ m^2$ upon the rear of the drawers, or by any other suitable means. The drawers may also be held in their backward or closed position in any suitable manner, as by shoulders or projections $m^3$ upon their front ends, which engage with notches $m^4$ in the supports $m$. This relative arrangement of the numerals, &c., above and in conjunction with the receptacles for the spaces, brackets, leads, quads, &c., is especially important and advantageous when used in connection with certain classes of matter in which none, or very few, of the upper and lower case characters are required, since the comparatively great size and weight of the spaces, leads, &c., practically prevent their arrangement in containing-channels like the character-types, while it is essential that they should be situated as close to the numeral-types as possible and incorporated in the case in order to expedite the operations of composition.

Mounted upon the top of the case A is a combined copy-holder and type-case cover, W, hinged to the upper part of the case in such manner that it may be turned and lowered into the position shown in Fig. 1, and thereby entirely inclose and protect all of the several compartments constituting the "case," its width being made equal to that of the case itself for this purpose. When the case is in use, this cover is supported in a suitably inclined position with relation to the front of the case and the position of the operator, as indicated in Fig. 3, by an adjustable device, which will allow of slight variations in the angle of support, that shown in the drawings consisting of a brace or pawl, $w$, secured to the top of the case, which engages with a rack, $w'$, upon the cover W, the said parts being held in engagement with each other and the accidental descent of the cover W being prevented by means of an elastic link or spring-coupling, $w^2$, interposed between and connecting the pawl $w$ and the cover W.

The edge or shelf $w^3$, for the support of "copy," may be formed upon the cover W, if desired; but, as shown in the drawings, it is permanently attached to the top of the case and furnishes a convenient bearing upon which to pivot the cover itself, the latter being recessed, as shown at $w^4$ in Figs. 2 and 3, to allow it to pass over the said shelf $w^3$.

Our case thus constructed and arranged, as the result of experiment and investigation, affords a simple, compact, and convenient device that is especially adapted to the ordinary requirements of a compositor when in use, while it is to be observed that when not in use the several compartments may be entirely inclosed and the type-containing channels, &c., effectually protected from dust or injury. The case as a whole, also, while being sufficiently durable for all practical purposes, is much cheaper to construct and more light and convenient to handle than those heretofore constructed.

What we claim as our invention, and desire to secure by Letters Patent, is—

1. In a compositor's type-case substantially such as designated, a series of superposed bed-plates provided with division-pieces of a comparatively soft non-metallic substance, the lower ends of the said division-pieces extending beyond the lower front edges of the bed-plates, and being provided with metallic seats for the support of the containing-channels and type-columns, substantially in the manner and for the purpose described.

2. In a compositor's type-case substantially such as designated, the combination and arrangement, with the division-pieces $a'$, secured to the bed-pieces $a$, of the finger-pieces or seats E, formed with shanks $e$, which project between the adjoining and vertically coinciding outer ends, $a^3$, of the said division-pieces, and with suitable type and channel supporting seats, substantially in the manner and for the purpose described.

3. In a compositor's type-case substantially such as designated, a type and channel seat provided with a type-supporting shoulder of a width equal to that of the largest type to be supported, and with a depression or recess immediately under the position of the foot of the lowest type resting thereon, the edge of the said type-supporting shoulder adjoining the recess being beveled outward at an oblique angle, substantially in the manner and for the purpose described.

4. In a compositor's type-case substantially such as designated, a type-column and channel-supporting seat formed with a suitable hole or recess for the reception of the body of a type or other suitable independent interchangeable piece bearing a denomination-mark, substantially in the manner and for the purpose described.

5. In a compositor's type-case substantially such as designated, the combination, with a type-column and channel-supporting seat formed with a suitable hole or recess for the reception of a piece bearing a denomination-mark, of an independently-interchangeable denomination-mark consisting of a plug or button the stem of which is composed of two or more slightly-elastic segments, for the purpose set forth.

6. In a compositor's type-case substantially such as designated, the combination and arrangement of a series of type-containing channels and supports in which the types are arranged in prescribed positions, as set forth, and one or more inclined space-holding compartments, into the upper end of which spaces may be deposited loosely, and by which they will be conducted downward and exposed for removal at any angle from the front of the case, substantially in the manner and for the purpose set forth.

7. In a compositor's type-case substantially such as designated provided with a series of inclined compartments, into the upper rear ends of which the spaces may be deposited loosely, and by which they will be conducted downward and exposed for removal at any angle from the front of the case, as described, the removable division-pieces or partitions arranged at the lower ends of the said inclined space-compartments, for the purpose and substantially in the manner set forth.

8. In a compositor's type-case substantially such as designated provided with a series of inclined compartments, into the upper rear ends of which the spaces may be deposited loosely, and by which they will be conducted downward and exposed for removal to any angle from the front of the case, as described, a removable end wall or type-supporting shoulder common to all the said compartments, and adapted to be wholly or partially withdrawn from position, for the purpose and substantially in the manner described.

9. The combination and arrangement in a single case of the series of type-containing channels and supports in which the types are arranged in prescribed positions, the series of sliding compartments for holding leads, quads, &c., and the inclined space-receptacles, into the upper ends of which spaces may be loosely deposited, and from the lower ends of which they may be removed at any angle, the whole constructed and operating substantially in the manner and for the purpose described.

LOUIS K. JOHNSON.
A. AUGUSTUS LOW.

Witnesses:
CHAS C. OVERTON,
HENRY GALE.